US007996360B2

(12) United States Patent
Iyengar et al.

(10) Patent No.: US 7,996,360 B2
(45) Date of Patent: Aug. 9, 2011

(54) COORDINATING UPDATES TO REPLICATED DATA

(75) Inventors: Arun Kwangil Iyengar, Yorktown Heights, NY (US); Thomas Repantis, Riverside, CA (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 12/147,763

(22) Filed: Jun. 27, 2008

(65) Prior Publication Data
US 2009/0327817 A1 Dec. 31, 2009

(51) Int. Cl.
*G06F 7/00* (2006.01)
(52) U.S. Cl. ............................ 707/622; 707/616; 707/638
(58) Field of Classification Search ........... 707/999.201, 707/610, 612, 622, 616, 638
See application file for complete search history.

(56) References Cited

U.S. PATENT DOCUMENTS

| | | | | |
|---|---|---|---|---|
| 4,714,996 | A * | 12/1987 | Gladney et al. ........................ | 1/1 |
| 5,878,434 | A * | 3/1999 | Draper et al. .......................... | 1/1 |
| 5,924,096 | A * | 7/1999 | Draper et al. .......................... | 1/1 |
| 6,122,659 | A * | 9/2000 | Olnowich ........................ | 709/213 |
| 6,408,365 | B1 * | 6/2002 | Hosomi ........................ | 711/144 |
| 6,581,075 | B1 * | 6/2003 | Guturu et al. ........................ | 1/1 |
| 6,934,720 | B1 * | 8/2005 | Jacobs et al. ........................ | 1/1 |
| 6,981,061 | B1 * | 12/2005 | Sakakura ........................ | 709/248 |
| 7,162,476 | B1 * | 1/2007 | Belair et al. ........................ | 1/1 |
| 7,500,020 | B1 * | 3/2009 | Kabra et al. ........................ | 709/248 |
| 7,822,711 | B1 * | 10/2010 | Ranade ........................ | 707/622 |
| 2002/0078305 | A1 * | 6/2002 | Khare et al. ........................ | 711/144 |
| 2002/0166031 | A1 * | 11/2002 | Chen et al. ........................ | 711/141 |
| 2002/0194206 | A1 * | 12/2002 | Ganesh et al. ........................ | 707/200 |
| 2005/0015436 | A1 * | 1/2005 | Singh et al. ........................ | 709/203 |
| 2005/0108298 | A1 * | 5/2005 | Iyengar et al. ........................ | 707/201 |
| 2005/0108481 | A1 * | 5/2005 | Iyengar et al. ........................ | 711/141 |
| 2007/0239797 | A1 * | 10/2007 | Cattell et al. ........................ | 707/201 |
| 2008/0134211 | A1 * | 6/2008 | Cui ........................ | 719/318 |

OTHER PUBLICATIONS

H.T. Kung et al.., "On Optimistic Methods for Concurrency Control," ACM Transactions on Database Systems, Jun. 1981, pp. 213-226, vol. 6, No. 2.
A. Adya et al., "Efficient Optimistic Concurrency Control Using Loosely Synchronized Clocks," Proc. of the ACM SIGMOD International Conference on Management of Data, May 1995, 12 pages, California.
P.A. Bernstein et al., "Concurrency Control in Distributed Database Systems," Computing Surveys, Jun. 1981, pp. 185-221, vol. 13, No. 2, Massachusetts.
H. Yu et al., "The Costs and Limits of Availability for Replicated Services," ACM Transactions on Computer Systems (TOCS), Feb. 2006, 14 pages, vol. 24, Issue 1.

* cited by examiner

*Primary Examiner* — Hung T Vy
*Assistant Examiner* — Phuong-Thao Cao
(74) *Attorney, Agent, or Firm* — Preston J. Young; Ryan, Mason & Lewis, LLP

(57) ABSTRACT

Techniques for coordinating updates to replicated data are disclosed. For example, in a system comprised of a plurality of nodes, a method for maintaining consistent copies of data across the nodes comprises the following steps. A copy of an object o1 is maintained by a plurality of nodes. In response to a request r1 to update a copy of object o1, a message is sent to at least some of the plurality of nodes instructing a node receiving the message to invalidate its copy of object o1. In response to a node n1 receiving an invalidation message arising from r1 wherein n1 is processing another request r2 to update object o1, requests r1 and r2 are coordinated to prevent the requests from causing conflicting updates or invalidations.

23 Claims, 4 Drawing Sheets

200

300

400

500

600

COORDINATING UPDATES TO REPLICATED DATA

FIELD OF THE INVENTION

The present invention relates to data processing systems and, more particularly, to techniques for coordinating updates to replicated data in such systems.

BACKGROUND OF THE INVENTION

Replication is commonly employed to address the Quality of Service requirements of distributed applications. In general, distributed applications are software programs running on multiple computing nodes in a distributed computing network. Examples of distributed applications include electronic commerce (e-commerce) applications, financial institution commodity trading applications, private business entity applications, to name just a few.

While replication improves both scalability and availability, it also introduces the problem of maintaining data consistent among the replicated computer nodes. In particular, strong consistency, which requires that all replicated data are current at all times, requires considerable overhead.

SUMMARY OF THE INVENTION

Principles of the invention provide techniques for coordinating updates to replicated data.

For example, in one embodiment, a method for maintaining consistent copies of data across nodes in a system comprised of a plurality of nodes comprises the following steps. A copy of an object o1 is maintained by a plurality of nodes. In response to a request r1 to update a copy of object o1, a message is sent to at least some of said plurality of nodes instructing a node receiving the message to invalidate its copy of object o1. In response to a node n1 receiving an invalidation message arising from r1 wherein n1 is processing another request r2 to update object o1, requests r1 and r2 are coordinated to prevent the requests from causing conflicting updates or invalidations.

The step of coordinating requests may further comprise the steps of selecting one of said requests r1 and r2, and updating object o1 based on the selected request. An update associated with a request which is not selected may be ignored. A request may be selected based on a time associated with the request. The step of coordinating requests may further comprise merging new content from both r1 and r2.

The method may further comprise the steps of maintaining a log of updates to o1, and using said log to undo at least one update to o1. The method may comprise the steps of maintaining statistics on frequencies with which objects are accessed and updated, and in response to o1 having a high ratio of accesses to updates, propagating a new value of o1 to at least one remote node.

Further, the method may comprise the steps of exchanging periodic heartbeat messages between said nodes to maintain availability information, and in response to a node failing to respond to a heartbeat message after a time period has elapsed, declaring said node failed.

Additionally, the method may comprise the step of in response to a node failing to respond to an invalidation message after a time period has elapsed, declaring said node failed. An update associated with a request which is not selected may be aborted and retried.

Still further, the method may comprise the step of exchanging lists of failed nodes to ensure nodes have a similar notion of which nodes have failed.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the invention provide a distributed protocol for providing strong consistency with less overhead than current lock-based approaches. We have implemented our protocol in a middleware that provides consistent replication for distributed multi-tier architectures.

Figure 1:
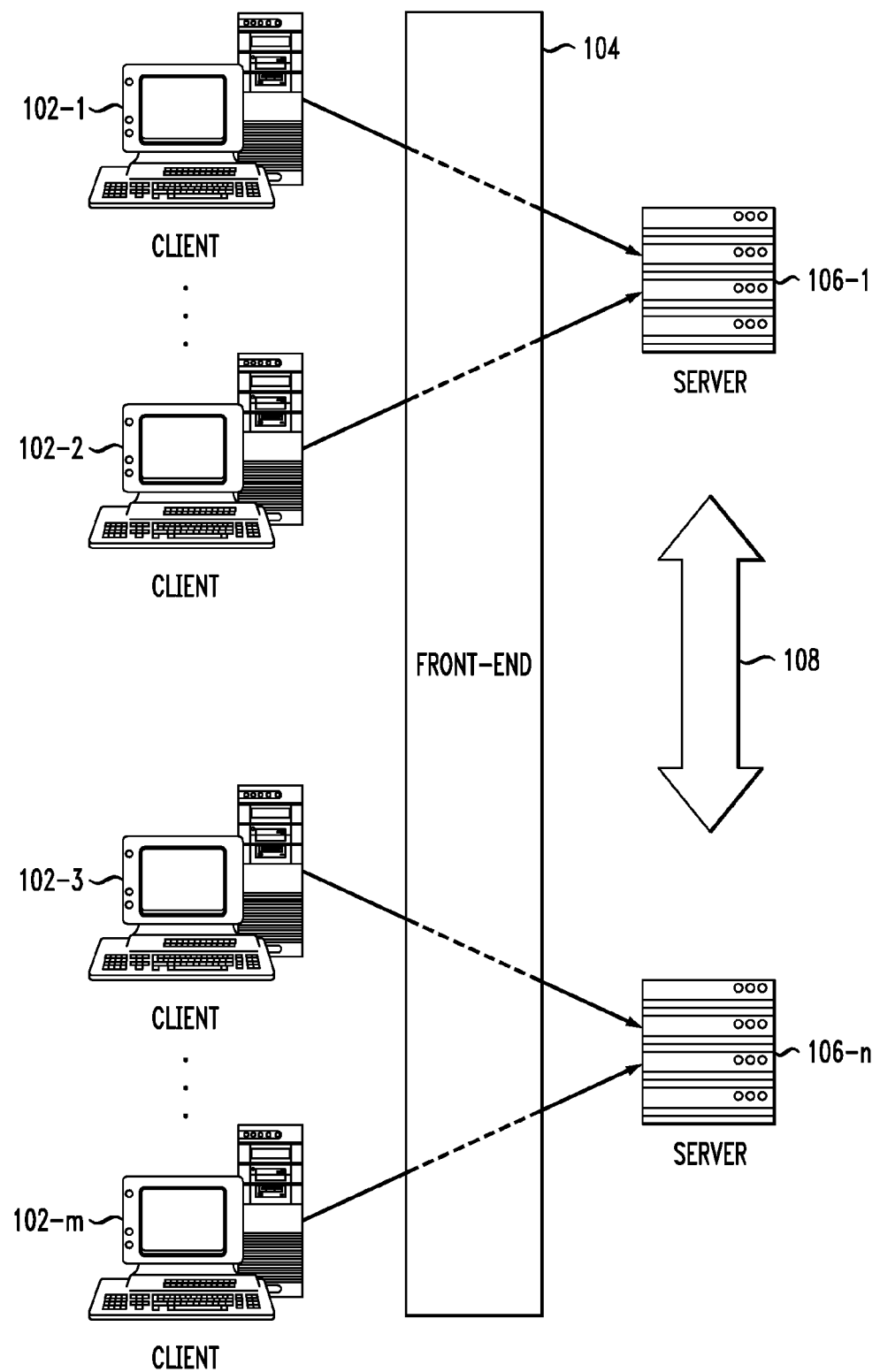
FIG. 1 illustrates a client-server system using replication, according to an embodiment of the invention.

The replication model 100 we are considering in this illustrative implementation is shown in FIG. 1. As shown, distributed computing network 100 includes a plurality of client devices 102-1 through 102-$m$ (client computing nodes or client nodes) operatively coupled to a plurality of server systems 106-1 through 106-$n$ (server nodes) via a front-end computing device 104.

In general, server systems (106-1 through 106-$n$) provide services (in accordance with applications running thereon), which are accessed by clients (102-1 through 102-$m$) over a network. Clients are redirected to servers via the front-end 104. The front-end distributed requests among servers trying to optimize some criterion, such as balancing the load across servers, or assigning clients to their geographically closest server. Replication is transparent to the clients, i.e., regardless of which server they communicate with, they see the same data at all times. A server can be hosted by one or more machines, but it represents one logical unit in our model. Servers communicate with each other over communication network 108, to maintain consistency, which is required for replication transparency. Strong consistency requires that, at all times, all clients access the same versions of all data replicated between the servers.

Figure 2:
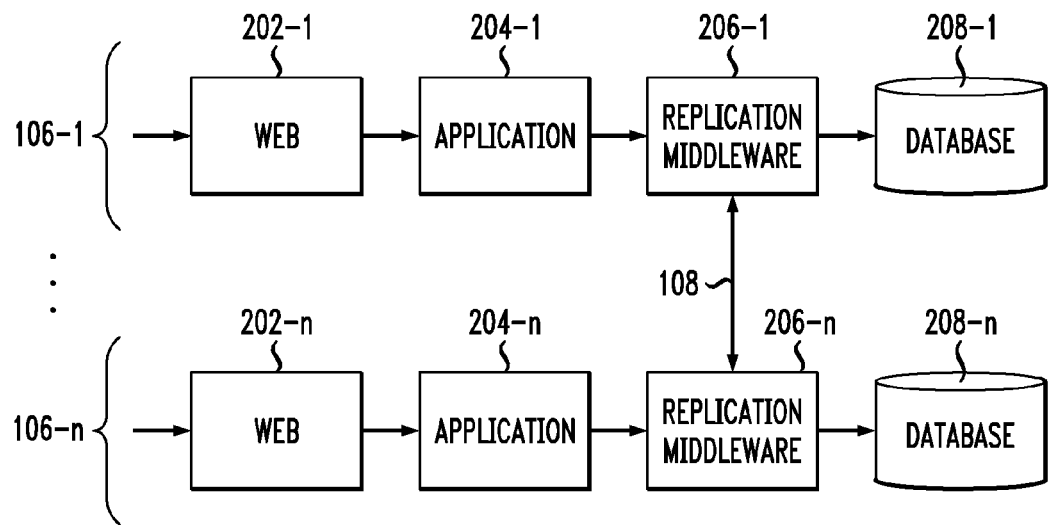
FIG. 2 illustrates our replication architecture, according to an embodiment of the invention.

Each server (106-1 through 106-$n$) assumes a tiered architecture 200 as shown in FIG. 2. A presentation tier includes a web server (202-1 ... 202-$n$) and is responsible for interaction with the clients. It accepts user requests and provides service results back to clients. A logic tier includes an application server (204-1 ... 204-$n$) and is responsible for executing the business logic (specific application logic). It executes the required services to produce the requested results. A data tier permanently stores the state of services in a database (208-1

...208-n). The inventive replication middleware (206-1 ... 206-n) lies between the logic and the data tiers and provides consistent replication.

To maintain consistency among server replicas, all accesses to the data tier are intercepted. Thus, the logic tier communicates only with the replication middleware, which is responsible for making the actual database calls. This interception can be active, by changing the application code running on the logic tier, or passive, by having the middleware provide an interface that makes it indistinguishable from a database from the application's perspective.

At each server, write operations (or, more simply, "writes") at a server are intercepted by the middleware (206) of that server, and in addition to being applied locally they are collected and sent to the rest of the servers in the form of updates (via communication network 108). Every server also receives updates from other servers and applies them locally. To provide strong consistency, read operations (or, more simply, "reads") at a server are also intercepted by the middleware (206) of that server, to ensure all updates have been applied before data are returned to a client.

We now describe the design of our distributed protocol for providing strong consistency without requiring locking or lock managers. Assuming nodes that maintain copies of data objects, we describe how the copies are kept consistent. The particular types of data objects are dependent on the particular application being executed. However, by way of example only, data objects may include data (e.g., documents, records, data sets, data units, etc.) associated with such applications as e-commerce sites, commodity trading sites, private business entity sites, etc.

Figure 3:
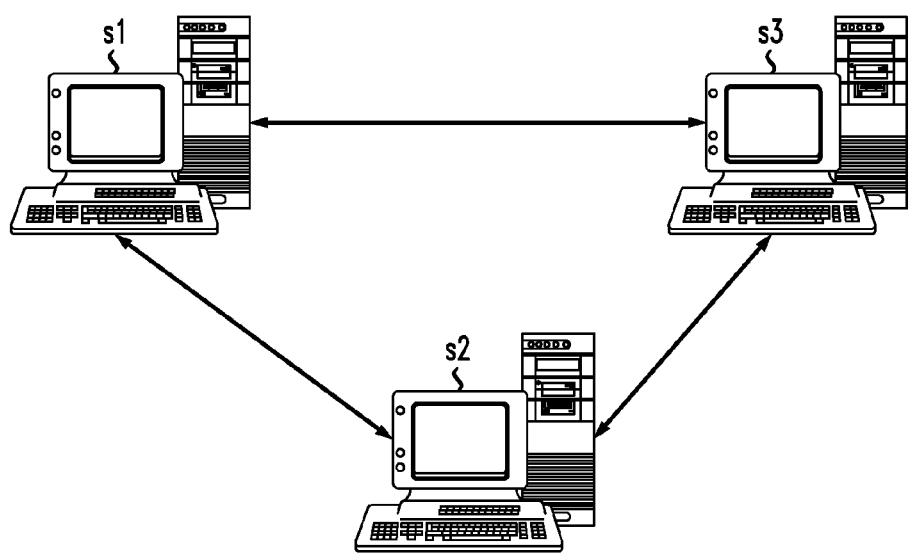
FIG. 3 illustrates a plurality of computer nodes communicating over a network to maintain consistency, according to an embodiment of the invention.

FIG. 3 depicts a plurality of computer nodes (servers), s1, s2, and s3, communicating over a network (300) to maintain consistency. The key problem is how to maintain copies of data objects in different nodes consistently. We now outline a method for maintaining copies of objects consistently, so that different versions of the same object are not offered by different nodes at the same time. In other words, we want to ensure that once a copy of an object o1 is updated in a node s1, the copies of o1 in all other nodes are updated as well, and that after the update has succeeded at s1, no other node serves an outdated copy of o1. The latter is important to offer strong and not just weak consistency. For strong consistency, it is not sufficient that all copies are updated at some point. It is also required that after an object update has been acknowledged as successful in any node, all nodes serve the updated version of the object.

Figure 4:
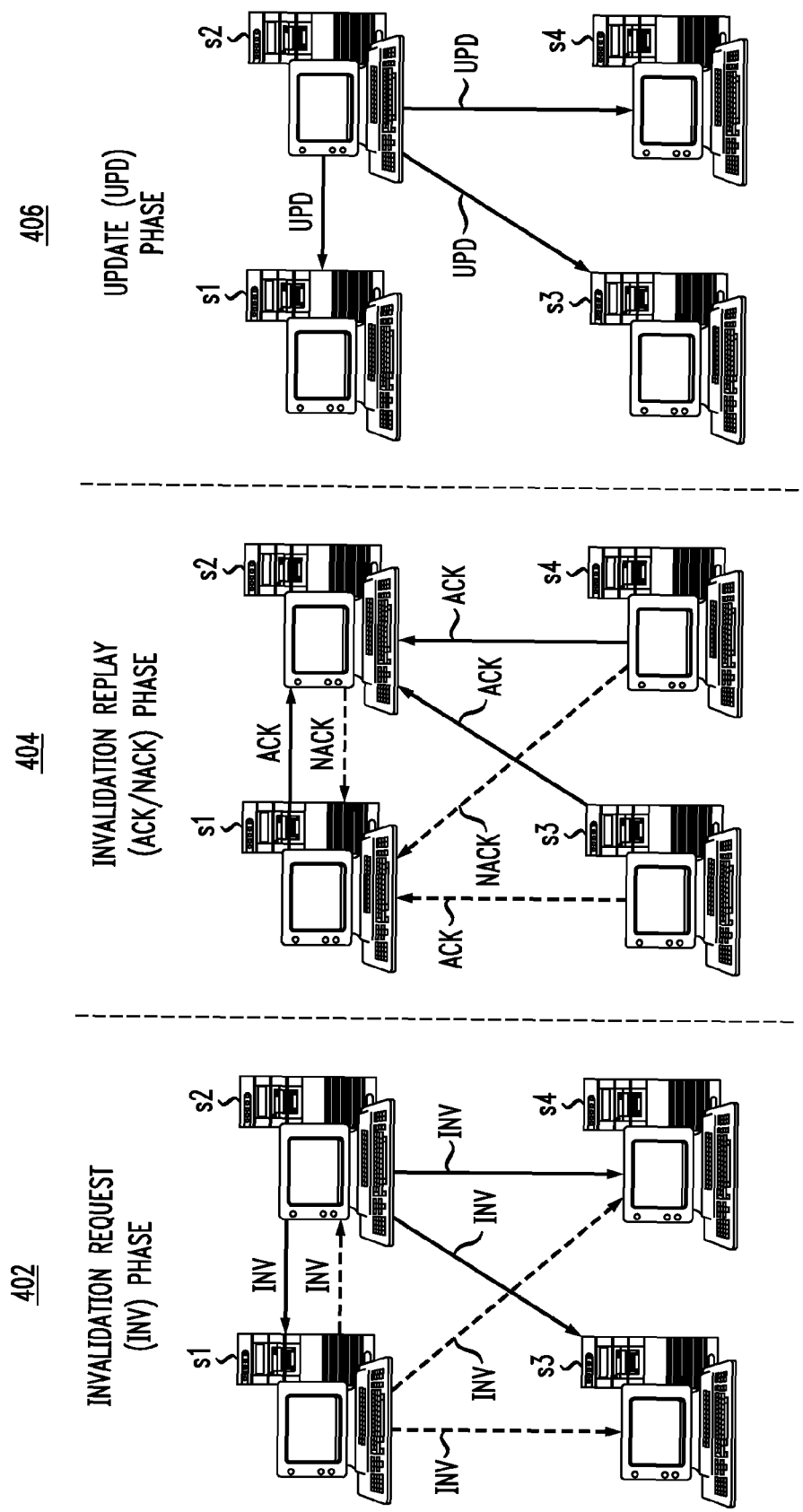
FIG. 4 illustrates a sample message exchange using a protocol, according to an embodiment of the invention.

Our protocol has three phases for updating an object, which include the exchange of corresponding messages, as shown in FIG. 4. The three phases are the invalidation request (402), the invalidation reply (404), and the actual update (406). Invalidation requests and replies are used to coordinate the updates on the copies of the objects. An example 400 of the execution of the distributed protocol is shown in FIG. 4. All phases are discussed in detail below.

It is important to handle update requests to objects in a consistent fashion. Let us assume that each node stores a copy of an object o1. Suppose that a node s1 receives a request r1 to update a data object o1. Update requests have timestamps associated with them, signifying when the request was generated. When node s1 attempts to update data object o1, it sends invalidation requests to other nodes that may have copies of o1; these invalidation requests include the timestamp of the update request r1. The timestamp reflects the local time at node s1 that initiated the request. While the clocks of all nodes can be loosely synchronized, the correctness of the protocol does not depend on that. As explained in the next paragraphs, the timestamps are used for the nodes to agree on a relative order between them, and could therefore be arbitrary. After s1 has received positive invalidation replies from all the nodes, indicating that they have invalidated their copies (or did not have a valid copy at the time the invalidation request was received), it can update o1. However, as we describe below, s1 may not always receive these positive invalidation replies and may not always be able to update o1.

When a node s2 receives s1's invalidation request to invalidate its copy of object o1, it responds with a positive or a negative invalidation reply depending on whether it will ensure that any valid copy of o1 has been invalidated. To decide whether it will invalidate an existing copy of o1, s2 checks whether it is also in the process of updating o1. If s2 is not in the process of updating o1, and if it has no valid copy of o1, it simply responds with a positive invalidation reply. If s2 is not in the process of updating o1 but has a valid copy of o1, it invalidates its copy of o1 and also responds with a positive invalidation reply.

If s2 is in the process of updating o1, let r2 be the update request associated with s2 that s2 is processing. Node s2 compares the timestamp of its update request, r2, with r1 (the update request associated with s1). The request with the earlier timestamp is ignored. (If both timestamps are equal, there are several methods for breaking this tie. For example, an ordering of the nodes could be imposed by comparing the hashes of the nodes' Internet Protocol (IP) addresses and port numbers and having the request from the node with the larger hash value dominate.) If r1 has the later timestamp, s2 invalidates o1 and sends a positive invalidation reply to s1. If r2 haw the later timestamp, s2 sends a negative invalidation reply to s1.

Node s1 updates object o1 after it has received positive invalidation replies from all other nodes; these indicate that the other nodes no longer have valid copies of the object. If s1 receives one or more negative invalidation replies, it aborts its attempt to update o1, and its update will be ignored. When s1 will receive the invalidation request for o1 corresponding to a request with a timestamp after r1, it will invalidate its copy of o1 and send a positive invalidation reply. More generally, after a node attempting to perform an update receives positive invalidation replies that all other nodes no longer have valid copies of o1, it will proceed with the update.

In some cases, a node may fail to respond to an invalidation message. In these situations, after a timeout period, the node may be declared down and the system can assume that the node no longer has a valid copy of the object. We describe in more detail how to handle failure detection below.

A variation on this approach is for a node s3 which is not processing an update request for o1 but has recently processed at least one invalidation request for o1 to maintain the latest timestamp, t1, of an update request corresponding to recently received invalidation requests for o1. If it receives a new invalidation request for o1 from a node s4 with a timestamp after t1, it sends back a positive invalidation reply. If it receives a new invalidation request for o1 from a node s4 with a timestamp before t1, it sends back a negative invalidation reply. This indicates to s4 that there is an update request with a later timestamp than its own update request and that it should not waste resources continuing to process its update request for o1 because it will be aborted. Negative invalidation replies from nodes that are not the ones intending to perform an update accelerate the decision of whether an object can be updated. However, the protocol correctness only depends on the replies of the nodes that are actually intending to perform an update. These nodes are the ones that will always send a negative invalidation reply, whereas other nodes may or may not do so, depending on the order with which they receive the invalidation requests.

Note how this method avoids locks. Furthermore, updates that would be overwritten are coalesced. When different nodes are concurrently processing different updates, only the update with the latest timestamp needs to be applied.

A node propagates an updated object to the rest of the nodes that maintained earlier copies of this object, using either a pull- or a push-based method, named demand-based updating and prefetching, respectively.

With demand-based updating, a node receives a new copy of an object only after receiving a request for this object. This pull-based method conserves resources in the event that an object is not requested. However, it incurs some additional latency the first time an object is accessed, since the object has to be fetched at that time. This method is appropriate for infrequently requested objects.

With prefetching, a node receives a new copy of an object before the object is requested; for example, this could happen right after that object is updated. This push-based method does not incur latency the first time an object is accessed, since the object has already been fetched. However, it wastes resources if an object is not accessed before it becomes obsolete. This method is appropriate for frequently requested objects.

To decide whether an updated object is propagated using demand-based updating or prefetching, statistics regarding the frequency with which objects are both accessed and updated can be maintained. If an object has a high ratio of accesses to updates, prefetching may be utilized. Otherwise, demand-based updating may be preferable for that object.

In most applications, if multiple entities attempt to concurrently update the same object, one writer simply overwrites the other. Thus, in our illustrative consistency protocol, updates are coalesced by applying only the latest one and ignoring the rest. If the application requires reconciling updates from multiple sources, when multiple writers detect each other, a reconciliation process can take place so that the concurrent updates are merged instead of always having one completely overwrite another. As an example, the merging process could be similar to that used by source control systems such as Concurrent Versions System (CVS). Other merging processes could be used as well. For example, the earliest update can be applied and the latest aborted and retried.

Another variation of our approach is to keep histories of updates and allow updates to be undone. To facilitate this reconciliation process, a log of received updates can be maintained, used to undo updates to objects. Updates can be made in a transactional fashion in which one or more updates can be committed at the same time.

To detect failures, nodes can exchange periodic heartbeat messages. When a node fails to respond to heartbeat messages after a threshold timeout period has elapsed, other nodes declare it as failed and do not require its invalidation replies before updating objects. When a node fails to receive heartbeat messages, it declares its replicated content invalid until it can revalidate them after connectivity is established again. This way a disconnected node (for example, due to a network partition) will not serve obsolete data.

After node failures are detected using the above heartbeat messages, we describe how they are handled for the different phases of the consistency protocol: if a node fails before replying to an invalidation request, the node that sent the invalidation request declares it as failed and does not require its invalidation reply. If a node fails after initiating but before completing an invalidation, in other words after sending invalidation requests, we consider two cases: if the node's update would have been overwritten due to a concurrent update (with a later timestamp) produced by another node, again it is declared as failed and its invalidation reply is not required. If the node's update was the single update, or the dominating one in case of multiple concurrent updates (the one with the latest timestamp), the rest of the nodes will not invalidate their copies. This way the incomplete update of the failed node is ignored.

To handle cases of network partitioning, i.e., cases in which certain nodes can communicate with each other while others cannot, we can give nodes a common view of failed nodes by disseminating that information whenever they determine a node failure.

We have implemented the above strong consistency protocol in a replication middleware, as a multi-threaded Java program. The middleware is used to maintain consistency among object replicas stored in databases that are queried by application servers to provide dynamic web content. Three types of messages are exchanged between nodes to implement the distributed protocol: invalidation requests, invalidation replies, and updates. Invalidation requests and replies are used to decide which changes should be applied. Updates are used to prefetch the object changes to the nodes.

Figure 5:
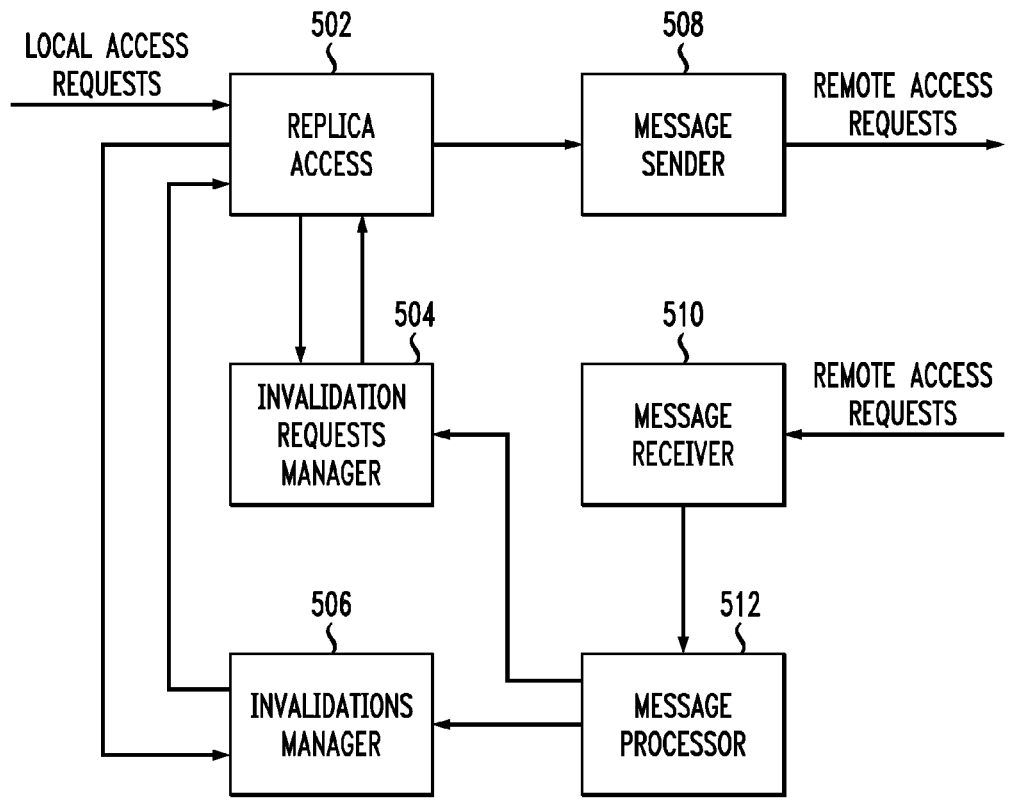
FIG. 5 illustrates a middleware implementation of a replication architecture, according to an embodiment of the invention.

FIG. 5 shows the building blocks of our replication middleware (500), responsible for consistency maintenance of the local objects and for communication with the remote nodes. There are six major modules. The replica access module (502) is responsible for providing permission to access objects in the local node and for sending invalidation requests and updates to the remote nodes. The invalidation requests manager module (504) keeps track of the invalidation requests the local node makes and notifies the replica access module once all remote nodes have replied to an invalidation request. The invalidations manager module (506) keeps track of the objects that have been invalidated and notifies the replica access module once an invalid object has been updated with its new version. The message sender module (508) is responsible for sending invalidation requests, invalidation replies, and updates to the remote nodes. The message receiver module (510) is a thread listening for incoming messages. Once a message is received, a new thread that implements the message processor module (512) is spawned to apply an update, or to determine whether an invalidation request should be positively or negatively acknowledged. For efficiency, we can avoid the creation and destruction of threads, by maintaining a thread pool.

We now describe in more detail how the protocol execution takes place using the modules above. A sample message exchange is shown in FIG. 4 and is discussed in the following paragraphs. When a node wants to read or write an object, the replica access grants that permission once the invalidations manager notifies it that the object is not invalid as currently being updated remotely. If the object is currently being updated, the notification takes place once the update is completed. When a node s1 wants to write on an object o1, it first ensures via the invalidations manager that o1 is not currently being updated. It then sends invalidation requests to all remote nodes that host copies of the object. It also calls the invalidation requests manager, which notifies it once all remote nodes have replied. If at least one of the invalidation replies was negative, this signifies that an update with a later timestamp will be applied on o1 by another node. Therefore, s1 aborts its attempt to write on o1, notifying the invalidation requests manager that the request was unsuccessful. If all invalidation replies were positive, the update can proceed. The invalidation requests manager is called to register the fact that the request was successful, the invalidations manager is called to register the fact that object o1 is currently being updated, the updates are sent, and the invalidations manager is called again to register the fact that o1 is not being updated anymore.

When a node s2 receives an invalidation request from node s1 to invalidate object o1, the message processor consults the invalidation requests manager to determine whether s2 has already sent invalidation requests for o1. If this is the case, the timestamps of the local (s2's) and the remote (s1's) invalidation requests are compared. The request with the later timestamp dominates and the one with the earlier timestamp will be ignored. If both timestamps are equal, the hashes of the nodes' IP addresses and port numbers are compared and the request from the node with the largest hash value dominates. If the local (s2's) invalidation request dominated, a negative invalidation reply is sent from s2 to s1. If the remote (s1's) invalidation request dominated, the invalidations request manager is called to register the fact that the local request is unsuccessful, and a positive invalidation reply is sent from s2 to s1. The invalidations manager at s2 is called to register the fact that object o1 is being updated. It is called again when the update message for o1, sent from s1, is received by s2, to register the fact that o1 is not being updated anymore.

When a node s3, that has not sent invalidation requests for o1, but has received an invalidation request for o1 from s2, receives an invalidation request for o1 from s1, it performs the timestamp comparison described above and sends a positive or negative invalidation reply to s1. If s1's invalidation request dominates, s3 calls its invalidations manager to register the fact that o1 is now being updated by s1 instead of s2.

Replies from nodes that are not the ones intending to perform an update can accelerate the decision of which update to be applied. However, the protocol correctness only depends on the replies of the nodes that are actually intending to perform an update, as is illustrated in the example of FIG. 4, which shows a sample message exchange. In dashed lines are the messages pertaining to s1's update attempt. In solid lines are the messages pertaining to s2's update attempt. "INV" denotes invalidation requests, "ACK" denotes positive invalidation replies, "NACK" denotes negative invalidation replies, and "UPD" denotes updates. Both s1 and s2 send invalidation request messages. Node s2's timestamp dominates and therefore its update is applied. The nodes responsible for deciding which update will be applied are s1 and s2. The rest of the nodes (s3 and s4) also compare timestamps and their replies can accelerate the decision, but the protocol correctness does not depend on their replies.

This is illustrated by the message exchange shown in FIG. 4: s2 compares the timestamp of its own invalidation request to the timestamp of the invalidation request of s1 and determines that its own update will be applied. Therefore, it sends a negative invalidation reply to s1. Similarly, s4 reaches the same conclusion and sends a positive invalidation reply to s2. Node s3, however, because of communication delay has received and processed the invalidation request of s1 before receiving the invalidation request of s2. Therefore, it sends a positive invalidation reply to s1, because it does not have to compare the timestamp of s1's invalidation request to that of any other request at that point. Once s3 receives the invalidation request of s2, it performs the timestamp comparison and sends a positive invalidation reply to s2 as well. Despite the fact that s3 sent a positive invalidation reply to s1, s1 still does not perform its update because of the negative invalidation reply it receives from s2 (and from s4). Therefore, the protocol execution is correct. Regardless of the replies of s3 and s4 (which depend on the order with which s3 and s4 happen to receive the invalidation requests of s1 and s2), s2 will definitely send a negative invalidation reply to s1. If the negative invalidation reply of one of the other nodes (s4 in this example) reaches s1 before s2's invalidation reply, s1 determines faster that its invalidation request was not successful. If due to communication delays causing nodes to receive messages in different order, one of the nodes other than s2 sends a positive invalidation reply (s3 in this example) that still does not lead s1 to reach a wrong conclusion, since it will definitely have a negative invalidation reply from s2.

Figure 6:
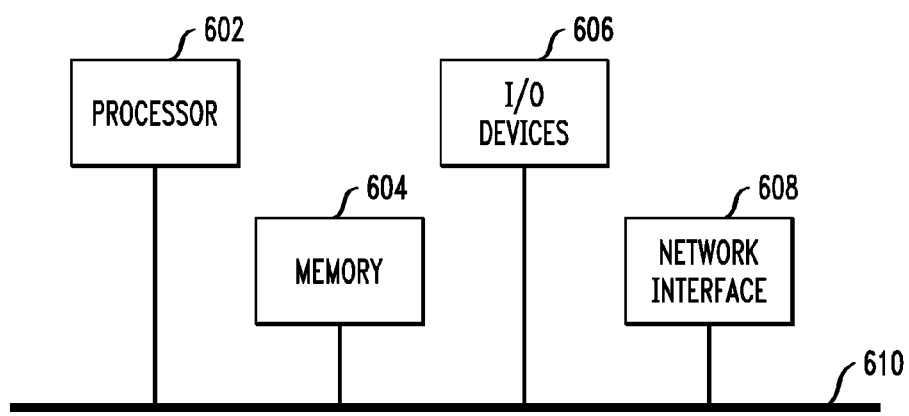
FIG. 6 illustrates a computer system, according to an embodiment of the invention.

Lastly, FIG. 6 illustrates a computer system in accordance with which one or more components/steps of the techniques of the invention may be implemented. It is to be further understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 6 may represent one or more client devices, one or more servers, or one or more other processing devices capable of providing all or portions of the functions described herein in the context of FIGS. 1-5.

The computer system 600 may generally include a processor 602, memory 604, input/output (I/O) devices 606, and network interface 608, coupled via a computer bus 610 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard disk drive), a removable memory device (e.g., diskette), flash memory, etc. The memory may be considered a "computer readable storage medium."

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including program instructions or code for performing the methodologies described herein may be stored in one or more of the associated memory devices (e.g., ROM, fixed or removable memory) and, when ready to be utilized, loaded in part or in whole (e.g., into RAM) and executed by a CPU. Such a memory device with said stored program instructions is an example of a "computer program product."

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. In a system comprised of a plurality of nodes, a method for storing consistent copies of objects across said plurality of nodes comprising steps of:
   processing a plurality of requests to update the objects;
   associating times with said plurality of requests;
   storing a copy of an object o1 by at least two of said plurality of nodes;
   a first node n0 receiving a request r1 to update a copy of the object o1, wherein the request r1 is associated with a time t1;
   the node n0 sending an invalidation message m1 including the time t1 to at least one of said plurality of nodes;
   a second node n1 receiving the message m1;
   in response to the node n1 being aware of another update request r2 to the object o1, wherein the request r2 is associated with a time t2, the node n1 processing the message m1 based on the time t1 and the time t2;
   in response to the node n0 receiving a negative reply to the message m1, the system aborting its attempt to update the object o1 according to the request r1; and
   in response to the node n0 receiving positive replies from each node to which the node n0 sent the message m1, the system updating the object o1 according to the request r1.

2. The method of claim 1, wherein the node n1 sends a negative response to the node n0 in response to the time t2 being after the time t1.

3. The method of claim 1, wherein the node n1 sends a positive response to the node n0 in response to the time t1 being after the time t2.

4. The method of claim 3, wherein the node n1 invalidates a copy of the object of that the node n1 is storing.

5. The method of claim 1, wherein the node n1 is processing the request r2 at the time the node n1 receives the message m1.

6. The method of claim 1, wherein the node n1 has finished processing the request r2 at the time the node n1 receives the message m1.

7. The method of claim 2, wherein the system updates the object o1 according to the request r2.

8. The method of claim 1, further comprising a step of:
   in response to the system aborting its attempt to update the object of in response to the request r1, the system attempting again to update the object o1 according to the request r1.

9. The method of claim 1, further comprising steps of:
   maintaining a log of updates to the object o1; and
   using said log to undo at least one update to the object o1.

10. The method of claim 1, further comprising steps of:
    maintaining statistics on frequencies with which objects are accessed and updated; and
    in response to the object o1 having a high ratio of accesses to updates, propagating a new value of the object o1 to at least one remote node.

11. The method of claim 1, further comprising steps of:
    exchanging periodic heartbeat messages between said nodes to maintain availability information; and
    in response to a node failing to respond to a heartbeat message after a time period has elapsed, declaring said node failed.

12. The method of claim 11, further comprising a step of:
    exchanging lists of failed nodes to ensure nodes have a similar notion of which nodes have failed.

13. The method of claim 1, further comprising a step of:
    in response to a node failing to respond to an invalidation message after a time period has elapsed, declaring said node failed.

14. In a system comprised of a plurality of nodes, a method for storing consistent copies of objects across said plurality of nodes comprising steps of:
    processing a plurality of requests to update the objects;
    associating times with said plurality of requests;
    storing a copy of an object o1 by at least two of said plurality of nodes;
    a first node n0 receiving a request r1 to update a copy of the object o1, wherein the request r1 is associated with a time t1;
    the node n0 sending an invalidation message m1 including the time t1 to at least one of said plurality of nodes;
    a second node n1 receiving the message m1;
    in response to the node n1 being aware of another update request r2 to the object o1 which the system is currently handling, wherein the request r2 is associated with a time t2, the node n1 processing the message m1 based on the time t1 and the time t2, and the system merging content from both the request r1 and the request r2 to create a new value for the object o1.

15. The method of claim 14, further comprising steps of:
    maintaining a log of updates to the object o1; and
    using said log to undo at least one update to the object o1.

16. The method of claim 14, further comprising steps of:
    maintaining statistics on frequencies with which objects are accessed and updated; and
    in response to the object o1 having a high ratio of accesses to updates, propagating a new value of the object o1 to at least one remote node.

17. The method of claim 14, further comprising steps of:
    exchanging periodic heartbeat messages between said nodes to maintain availability information; and
    in response to a node failing to respond to a heartbeat message after a time period has elapsed, declaring said node failed.

18. The method of claim 17, further comprising a step of:
    exchanging lists of failed nodes to ensure nodes have a similar notion of which nodes have failed.

19. The method of claim 14, further comprising a step of:
    in response to a node failing to respond to an invalidation message after a time period has elapsed, declaring said node failed.

20. In a system comprised of a plurality of nodes, an apparatus for storing consistent copies of objects across said plurality of nodes, comprising at a first node n1 of the plurality of nodes:
    a memory; and
    a processor coupled to the memory and configured to:
    receive a request r1 to update a copy of an object o1, wherein the request r1 is associated with a time t1 and wherein the copy of the object o1 is stored by at least two of said plurality of nodes;
    send an invalidation message m1 including the time t1 to at least one of said plurality of nodes;
    wherein a second node n1 receives the message m1;

in response to the node n1 being aware of another update request r2 to the object o1, wherein the request r2 is associated with a time t2, the node n1 processes the message m1 based on the time t1 and the time t2; in response to the node n0 receiving a negative reply to the message m1, the system aborts its attempt to update the object o1 according to the request r1; and, in response to the node n0 receiving positive replies from each node to which the node n0 sent the message m1, the system updates the object o1 according to the request r1.

21. In a system comprised of a plurality of nodes, a computer program product for storing consistent copies of objects across said plurality of nodes, the computer program product comprising:

a computer readable storage medium associated with a first node n0 of the plurality of nodes;

a first program instruction to receive a request r1 to update a copy of an object o1, wherein the request r1 is associated with a time t1 and wherein the copy of the object o1 is stored by at least two of said plurality of nodes; and a second program instruction to send an invalidation message m1 including the time t1 to at least one of said plurality of nodes;

wherein a second node n1 receives the message m1; in response to the node n1 being aware of another update request r2 to the object o1, wherein the request r2 is associated with a time t2, the node n1 processes the message m1 based on the time t1 and the time t2; in response to the node n0 receiving a negative reply to the message m1, the system aborts its attempt to update the object o1 according to the request r1; and, in response to the node n0 receiving positive replies from each node to which the node n0 sent the message m1, the system updates the object o1 according to the request r1.

22. In a system comprised of a plurality of nodes, an apparatus for storing consistent copies of objects across said plurality of nodes, comprising at a first node n0 of the plurality of nodes:

a memory; and a processor coupled to the memory and configured to:

receive a request r1 to update a copy of an object o1, wherein the request r1 is associated with a time t1 and wherein the copy of the object o1 is stored by at least two of said plurality of nodes;

send an invalidation message m1 including the time t1 to at least one of said plurality of nodes;

wherein a second node n1 receives the message m1; and, in response to the node n1 being aware of another update request r2 to the object o1 which the system is currently handling, wherein the request r2 is associated with a time t2, the node n1 processing the message m1 based on the time t1 and the time t2, and the system merges content from both the request r1 and the request r2 to create a new value for the object o1.

23. In a system comprised of a plurality of nodes, a computer program product for storing consistent copies of objects across said plurality of nodes, the computer program product comprising:

a computer readable storage medium associated with a first node n0 of the plurality of nodes;

a first program instruction to receive a request r1 to update a copy of an object o1, wherein the request r1 is associated with a time t1 and wherein the copy of the object o1 is stored by at least two of said plurality of nodes; and a second program instruction to send an invalidation message m1 including the time t1 to at least one of said plurality of nodes;

wherein a second node n1 receives the message m1; and, in response to the node n1 being aware of another update request r2 to the object o1 which the system is currently handling, wherein the request r2 is associated with a time t2, the node n1 processing the message m1 based on the time t1 and the time t2, and the system merges content from both the request r1 and the request r2 to create a new value for the object o1.

* * * * *